(12) United States Patent
Wu et al.

(10) Patent No.: US 11,678,764 B2
(45) Date of Patent: Jun. 20, 2023

(54) SANDWICH MAKER

(71) Applicant: PRESIDENT CHAIN STORE CORP., Taipei (TW)

(72) Inventors: Yu-Chieh Wu, Taipei (TW); I-Ting Chang, Taipei (TW)

(73) Assignee: PRESIDENT CHAIN STORE CORP, Taipei (TW)

( * ) Notice: Subject to any disclaimer, the term of this patent is extended or adjusted under 35 U.S.C. 154(b) by 287 days.

(21) Appl. No.: 17/105,779

(22) Filed: Nov. 27, 2020

(65) Prior Publication Data

US 2022/0125239 A1 Apr. 28, 2022

(30) Foreign Application Priority Data

Oct. 22, 2020 (TW) .................................. 109213951

(51) Int. Cl.
   *A47J 37/06* (2006.01)
(52) U.S. Cl.
   CPC ....... *A47J 37/0611* (2013.01); *A47J 37/0629* (2013.01)
(58) Field of Classification Search
   CPC .... A47J 37/0611; A47J 37/0629; A23L 7/187
   See application file for complete search history.

(56) References Cited

U.S. PATENT DOCUMENTS

| | | | |
|---|---|---|---|
| 2005/0284306 A1 | 12/2005 | Backus et al. | |
| 2006/0249032 A1* | 11/2006 | Kim | A23L 7/187 99/353 |
| 2015/0230659 A1* | 8/2015 | Hoare | A47J 37/0611 99/375 |
| 2017/0367531 A1* | 12/2017 | Yan | A47J 37/0611 |

FOREIGN PATENT DOCUMENTS

| | | |
|---|---|---|
| CN | 210471932 U | 5/2020 |
| CN | 213404661 U | 6/2021 |
| GB | 712375 A | 7/1954 |

\* cited by examiner

*Primary Examiner* — Justin C Dodson
*Assistant Examiner* — Dilnessa B Belay
(74) *Attorney, Agent, or Firm* — Muncy, Geissler, Olds & Lowe, P.C.

(57) ABSTRACT

A sandwich maker includes a base, a first hot-pressing module, a connecting rod set, a second hot-pressing module, a driving motor, and a control module. The first hot-pressing module is assembled to the base. The connecting rod set is pivotally disposed on the base and pivots between a standby position and a heating position. The second hot-pressing module is assembled to the connecting rod set, and is moved between the standby position and the heating position driven by the connecting rod set. At the standby position, the second hot-pressing module is far away from the first hot-pressing module. At the heating position, the second hot-pressing module correspondingly covers the first hot-pressing module. The driving motor is connected to and drives the connecting rod set. The control module is electrically connected to and controls the first hot-pressing module, the second hot-pressing module, and the driving motor.

9 Claims, 6 Drawing Sheets

SANDWICH MAKER

CROSS-REFERENCE TO RELATED APPLICATION

This non-provisional application claims priority under 35 U.S.C. § 119(a) to Patent Application No. 109213951 filed in Taiwan, R.O.C. on Oct. 22, 2020, the entire contents of which are hereby incorporated by reference.

BACKGROUND

Technical Field

The present invention relates to a sandwich maker, and in particular, to a sandwich maker that can automatically perform a hot-pressing operation.

Related Art

A sandwich maker is a very common pastry machine at present. Through design of a shape of a mold cavity in a hot-pressing structure and a bearing structure ingredient-containing toast is heated up quickly, and various creative shapes and dishes are completed quickly.

Generally, a sandwich maker in the market mainly manually operates the hot-pressing structure and the bearing structure pivotally connected to each other to rotate the structures relatively from a mutually separation state to a binding state, so as to heat up and press food such as a toast placed in the mold cavity. However, at present, the sandwich maker in the market can only manually heat up the food placed in the mold cavity. When heating is completed, the sandwich maker needs to be opened manually to stop heating. However, if mass production is required in this way, more manpower and time are spent on operation of the machine. In addition, if the sandwich maker is not opened in time after the heating is completed, the food is continuously heated, so that the food is overheated and thus burnt and inedible.

SUMMARY

In view of this, the present invention provides a sandwich maker, including a base, a first hot-pressing module, a connecting rod set, a second hot-pressing module, a driving motor, and a control module. The first hot-pressing module is assembled to the base. The connecting rod set is pivotally disposed on the base and pivots between a standby position and a heating position. The second hot-pressing module is assembled to the connecting rod set, and is moved between the standby position and the heating position driven by the connecting rod set. At the standby position, the second hot-pressing module is far away from the first hot-pressing module. At the heating position, the second hot-pressing module correspondingly covers the first hot-pressing module. The driving motor is connected to and drives the connecting rod set. The control module is electrically connected to and controls the first hot-pressing module, the second hot-pressing module, and the driving motor.

Therefore, the sandwich maker of embodiments of the present invention controls a driving motor through a control module, to cause the driving motor to drive the connecting rod set to rotate with the base as an axis. Therefore, the second hot-pressing module is closer to and away from the first hot-pressing module, so as to automatically complete heating of to-be-heated food. For example, after the to-be-heated food (such as toast) is placed in the first hot-pressing module, the control module controls the driving motor, so that the driving motor drives the connecting rod set to rotate with the base as the axis, so as to cause the second hot-pressing module to be correspondingly moved to cover the first hot-pressing module. For the to-be-heated food, the to-be-heated food may be heated and shaped under opposite pressing and heating of the first hot-pressing module and the second hot-pressing module. When the heating is completed, the control module controls the driving motor, so that the driving motor drives the connecting rod set to rotate with the base as the axis, so as to cause the second hot-pressing module to be away from the first hot-pressing module, thereby stopping continuous pressing and heating of the to-be-heated food.

Based on the foregoing, the sandwich maker may be operated and perform hot pressing in a fully automatic manner. In this way, after the to-be-heated food is placed in the first hot-pressing module and activated, the sandwich maker automatically performs hot pressing, achieving automation and humanization.

The following details are illustrated by using specific embodiments with reference to the accompanying drawings, so that it is easier to understand the purpose, the technical content, the features, and the effects achieved therein.

DETAILED DESCRIPTION

Figure 1:
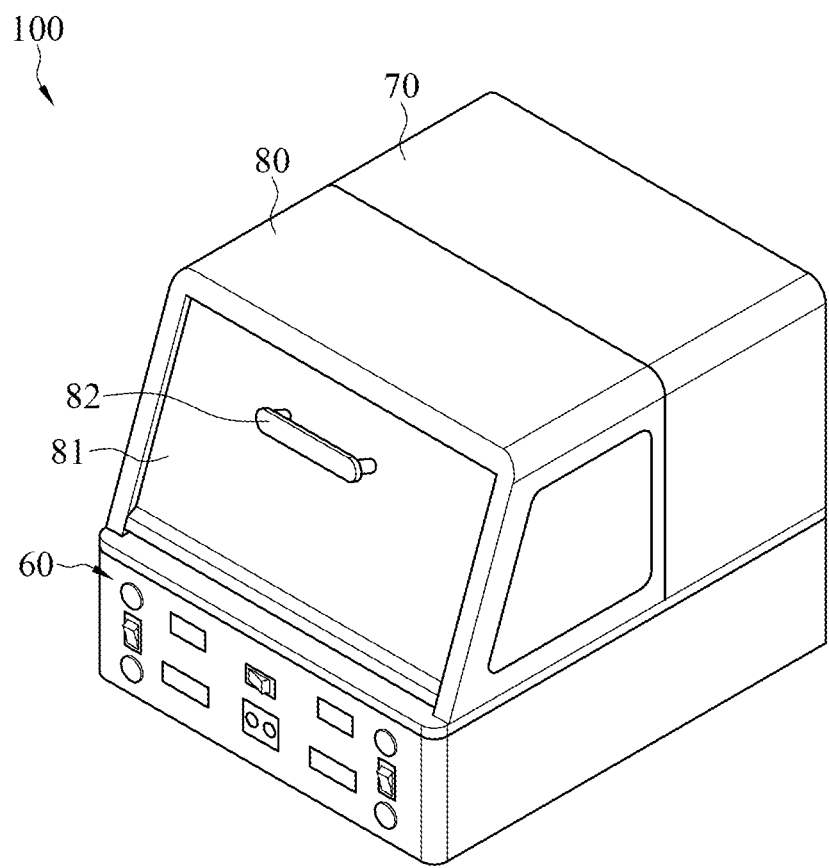
FIG. 1 is a schematic diagram of an appearance of a sandwich maker according to an embodiment of the present invention.

The embodiments of the present invention will be described in detail below by way of example and with reference to the accompanying drawings. In the specification, numerous specific details are set forth in order to provide a thorough understanding of the present invention. However, the present invention may be practiced without some or all of the specific details. The same or similar elements in the drawings will be denoted by the same or similar symbols. It should be noted that the accompanying drawings are only schematic, and do not represent the actual size or quantity of elements. Some details may not be completely drawn, so as to keep the accompanying drawings concise.

Figure 2:
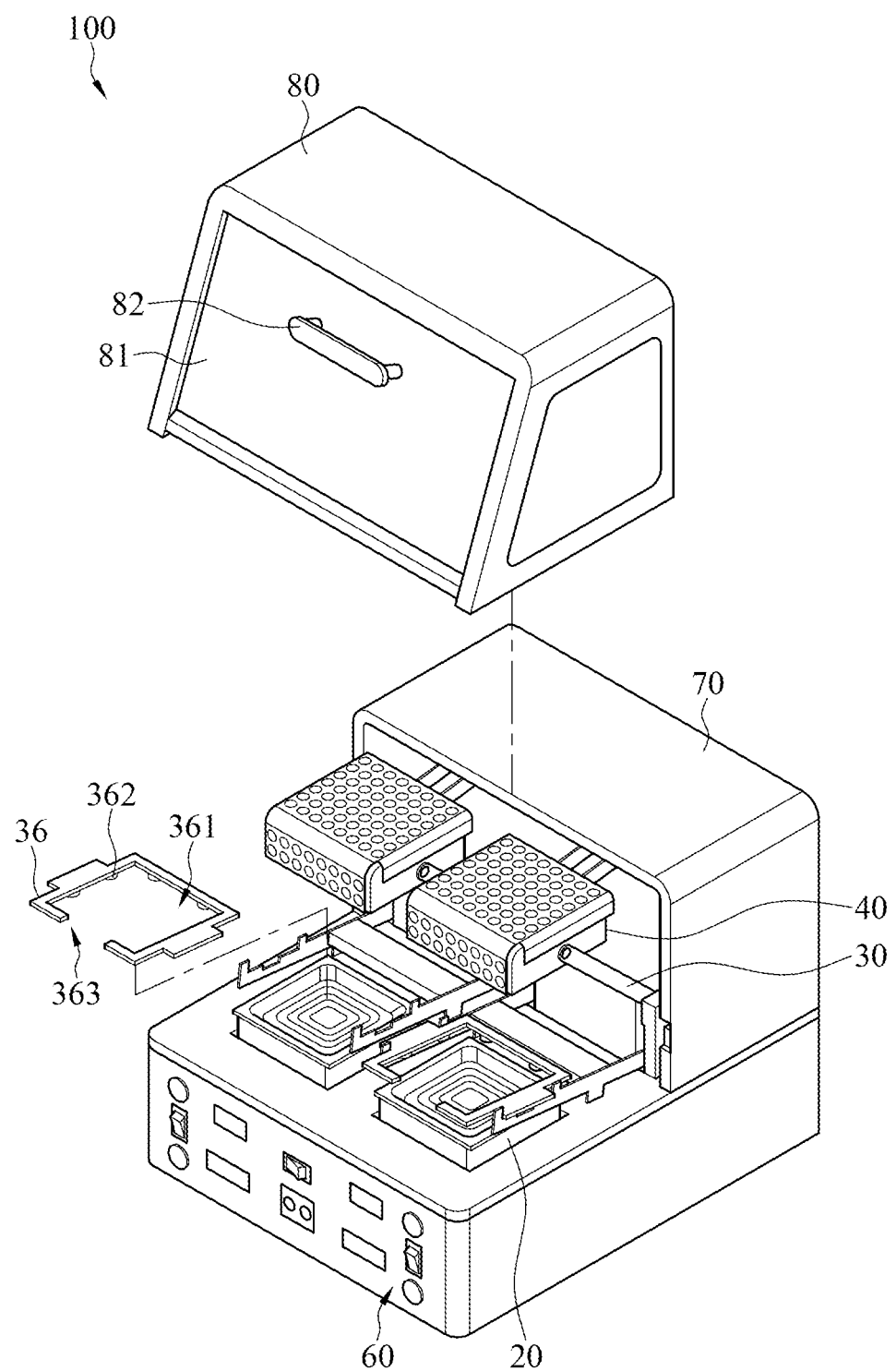
FIG. 2 is a schematic partial exploded diagram of the sandwich maker according to an embodiment of the present invention.
Figure 3:
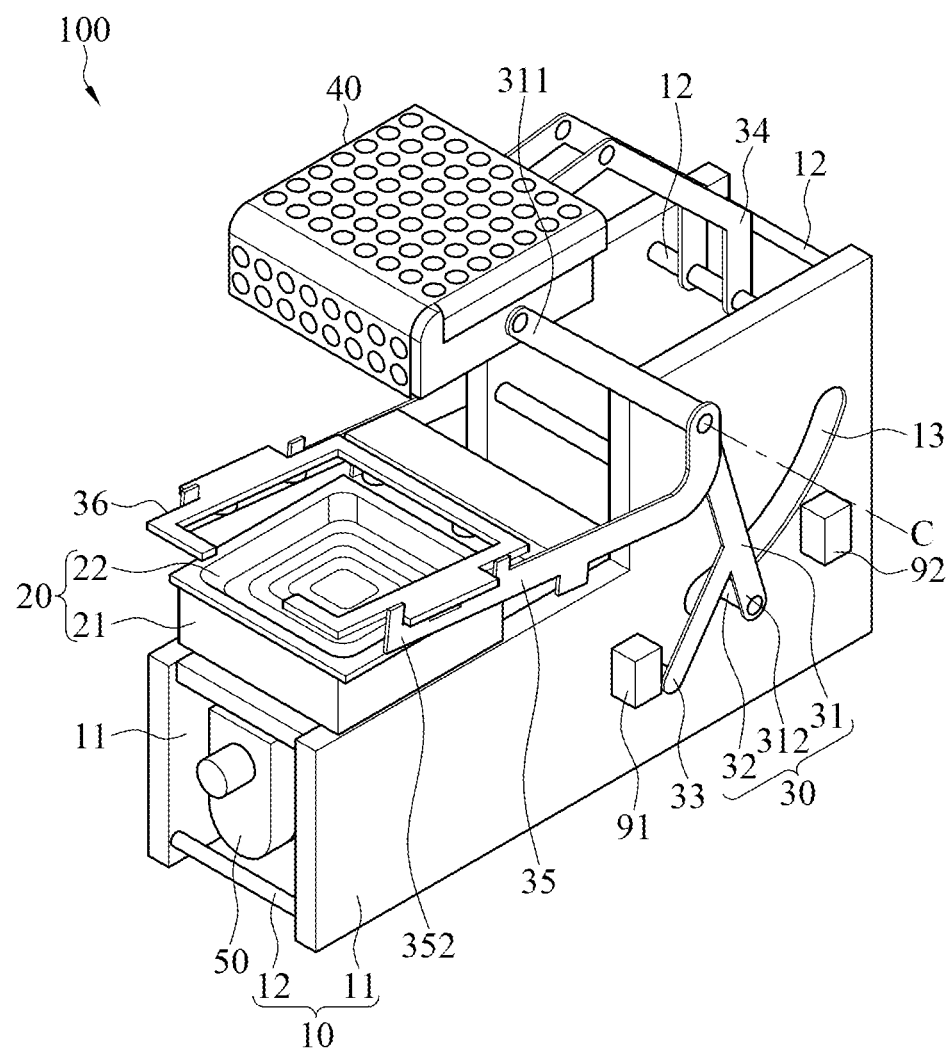
FIG. 3 is a schematic diagram of some assemblies of the sandwich maker according to an embodiment of the present invention.
Figure 4:
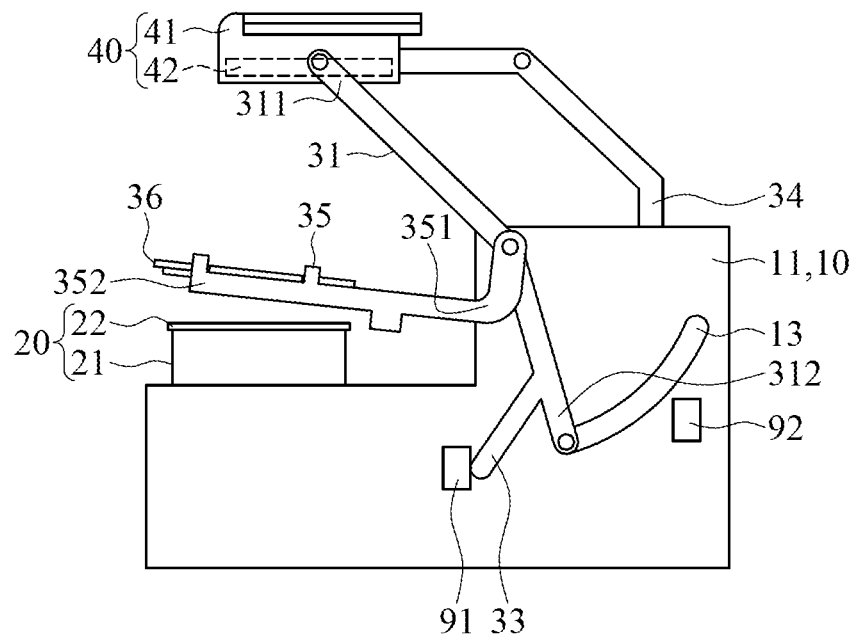
FIG. 4 is a schematic side view of actuation of some assemblies of the sandwich maker at a standby position according to an embodiment of the present invention.
Figure 5:
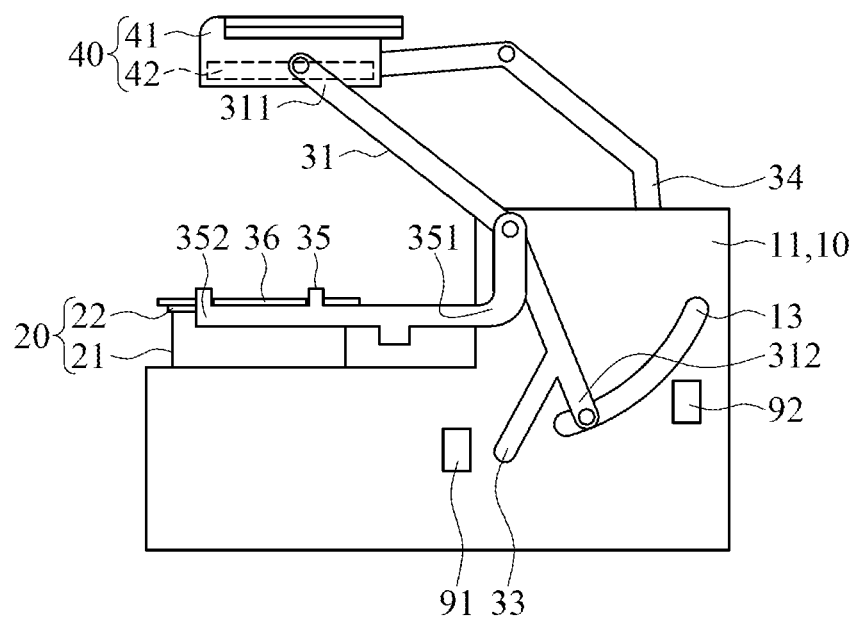
FIG. 5 is a schematic side view of actuation of some assemblies of the sandwich maker moved to a heating position according to an embodiment of the present invention.
Figure 6:
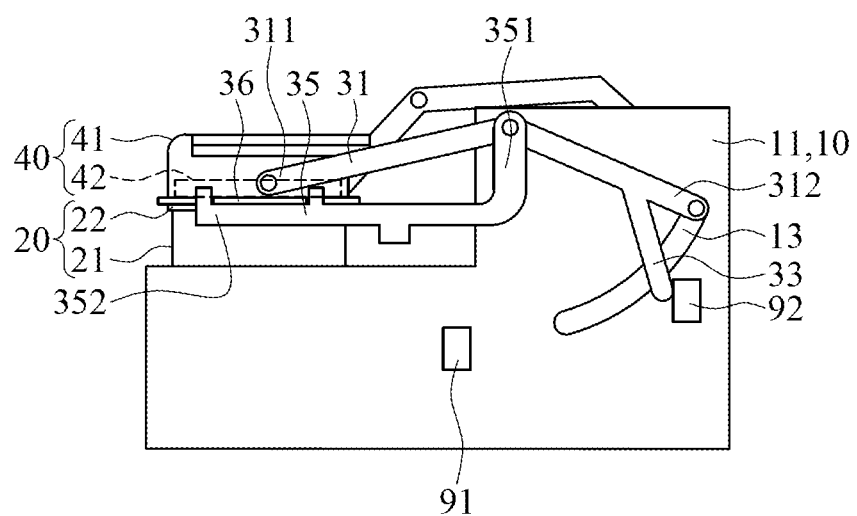
FIG. 6 is a schematic side view of actuation of some assemblies of the sandwich maker at the heating position according to an embodiment of the present invention.
Figure 7:
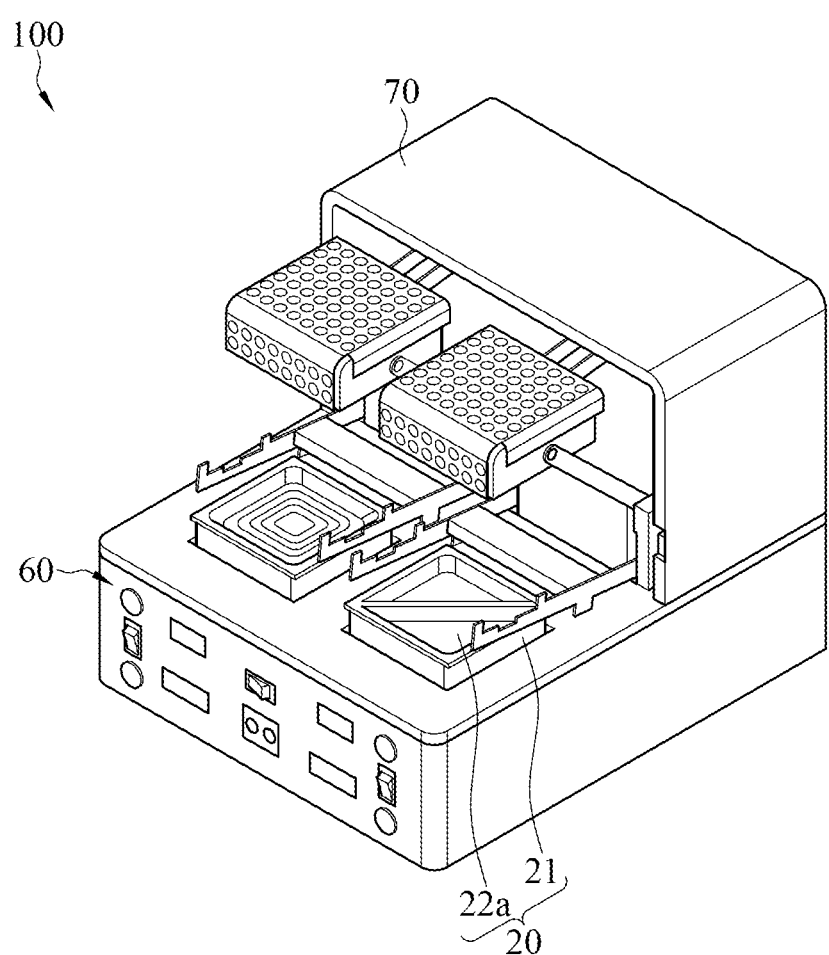
FIG. 7 is a schematic partial exploded diagram of the sandwich maker according to another embodiment of the present invention.

FIG. 1 is a schematic diagram of an appearance of a sandwich maker according to an embodiment of the present invention. FIG. 2 is a schematic partial exploded diagram of the sandwich maker according to an embodiment of the present invention. FIG. 3 is a schematic diagram of some assemblies of the sandwich maker according to an embodiment of the present invention. FIG. 4 is a schematic side view of actuation of some assemblies of the sandwich maker at a standby position according to an embodiment of the present invention. FIG. 5 is a schematic side view of actuation of some assemblies of the sandwich maker moved to a heating position according to an embodiment of the present invention. FIG. 6 is a schematic side view of actuation of some assemblies of the sandwich maker at the heating position according to an embodiment of the present invention. FIG. 7 is a schematic partial exploded diagram of the sandwich maker according to another embodiment of the present invention.

It can be seen from FIG. 1 to FIG. 3 that a sandwich maker 100 of the present invention includes a base 10, a first hot-pressing module 20, a connecting rod set 30, a second hot-pressing module 40, a driving motor 50, a control module 60, an outer housing 70, and an opening-closing cover 80. FIG. 3 shows a smallest module unit of the sandwich maker 100 according to this embodiment. If the control module 60 is assembled to the base 10, the sandwich maker can also be operated directly even without the outer housing 70 and the opening-closing cover 80.

In order to make an overall appearance beautiful and avoid scalding or collision damage during operation, in this embodiment, the outer housing 70 and the opening-closing cover 80 are configured to cover the base 10, the first hot-pressing module 20, the connecting rod set 30, the second hot-pressing module 40, and the driving motor 50, and the control module 60 is assembled to the outer housing 70. The opening-closing cover 80 is assembled to the outer housing 70 to place or take out to-be-heated food through the opening-closing cover 80. As shown in FIG. 1 and FIG. 2, an operation window 81 that may be opened and closed is disposed on a front side of the opening-closing cover 80. A user can open or close the operation window 81 by holding a handle 82 on the operation window 81 and using a bottom side of the operation window 81 as a rotation axis. In addition, the operation window 81 and both sides of the opening-closing cover 80 may be provided with transparent glass or transparent plastic, so that internal actuation may be viewed from the outside.

First, referring to FIG. 3, as previously described, FIG. 3 shows a smallest module unit of the sandwich maker 100 according to this embodiment. It can be seen from FIG. 3 that in this embodiment, the base 10 may be composed of two side plates 11 of a same shape disposed in parallel. The two side plates 11 may be connected through a plurality of support columns 12 to fix a shape of the base 10. Other elements are assembled between the two side plates 11. However, in other implementations, the base 10 may also be a hollow base body, which is formed of an integrally formed metal substrate. Then, each structure is received in the hollow base body.

The first hot-pressing module 20 is assembled to the base 10 and located at a front end of the base 10. The first hot-pressing module 20 includes a first heating device 21 and a first pressing mold 22. The first heating device 21 is assembled between the two side plates 11 of the base 10. The first heating device 21 may be implemented by, for example, a heating tube or a heating plate. A housing is covered on an outside of the first heating device to avoid direct exposure and cause burning due to accidental touch, and make the first heating device beautiful visually. The first pressing mold 22 is detachably assembled over the first heating device 21. The first pressing mold 22 is made of metal or stainless steel, and may be directly placed on the first heating device 21 to transfer heat generated by the first heating device 21 to to-be-heated food via the first pressing mold 22. In addition, the first pressing mold 22 may be any desired shape, such as a rectangle that tapers from an outside to a center as shown in FIG. 3 or a first pressing mold 22a disposed to have two triangle shapes as shown in another embodiment of FIG. 7, so that the to-be-heated food is pressed hot into a desired shape.

Still referring to FIG. 3, the connecting rod set 30 is pivotally disposed on the base 10 and pivots between a standby position and a heating position (detailed later). The second hot-pressing module 40 is assembled to a connecting rod set 30, and is moved between the standby position and the heating position driven by the connecting rod set 30. The second hot-pressing module 40 includes a second heating device 41 and a second pressing mold 42. The second heating device 41 is assembled to the connecting rod set 30. The second heating device 41 may be implemented by, for example, a heating tube or a heating plate. A housing is covered on an outside of the second heating device to avoid direct exposure and cause burning due to accidental touch, and make the second heating device beautiful visually. The second pressing mold 42 is detachably assembled over the second heating device 41. The second pressing mold 42 is made of metal or stainless steel, and may be directly fixed to the second heating device 41 to transfer heat generated by the second heating device 41 to to-be-heated food via the second pressing mold 42. In addition, the second pressing mold 42 may be of any desired shape as the first pressing mold 22, which is not further detailed herein.

The driving motor 50 is connected to and drives the connecting rod set 30. The control module 60 is electrically connected to and controls the first hot-pressing module 20, the second hot-pressing module 40, and the driving motor 50. It can be seen from FIG. 3 that the driving motor 50 is assembled between the two side plates 11 of the base 10. Then, the driving motor 50 has an actuating rod (not shown) that can perform linear reciprocating motion. The actuating rod is connected to the connecting rod set 30 and actuates the connecting rod set 30.

Next, first referring to FIG. 4, FIG. 4 is a side view of a structure of a sandwich maker 100 shown in FIG. 3. For example, actuation on a single side is described herein. FIG. 5 is a schematic diagram of the sandwich maker 100 at a standby position. When the sandwich maker 100 is at the standby position, a second hot-pressing module 40 is far away from a first hot-pressing module 20. FIG. 6 is a schematic diagram of the sandwich maker 100 at a heating position. At the heating position, the second hot-pressing module 40 correspondingly covers the first hot-pressing module 20 and heats to-be-heated food placed between the first hot-pressing module 20 and the second hot-pressing module 40.

Therefore, the sandwich maker 100 of this embodiment controls a driving motor 50 through a control module 60, so that the driving motor 50 drives a connecting rod set 30 to rotate with a base 10 as an axis, so as to cause the second hot-pressing module 40 to be closer to and away from the first hot-pressing module 20, thereby automatically completing heating of the to-be-heated food. As previously described, after the to-be-heated food (such as toast) is placed in the first hot-pressing module 20, the control module 60 controls the driving motor 50, so that the driving motor 50 drives the connecting rod set 30 to rotate with the base 10 as the axis, so as to cause the second hot-pressing module 40 to be correspondingly moved to cover the first hot-pressing module 20. For the to-be-heated food, the to-be-heated food may be heated and shaped under opposite pressing and heating of the first hot-pressing module 20 and the second hot-pressing module 40. When the heating is completed, the control module 60 controls the driving motor 50, so that the driving motor 50 drives the connecting rod set 30 to rotate with the base 10 as the axis, so as to cause the second hot-pressing module 40 to be away from the first hot-pressing module 20 and return to the standby position shown in FIG. 4, thereby stopping continuous pressing and heating of the to-be-heated food.

In this way, the sandwich maker 100 may be operated and perform hot pressing in a fully automatic manner. In this way, after the to-be-heated food is placed in the first hot-pressing module 20 and activated, the sandwich maker 100 automatically performs hot pressing, achieving automation and humanization.

Next, each structure of the sandwich maker 100 in this embodiment is described in detail. It can be seen from FIG. 3 that the connecting rod set 30 includes two first rods 31 (only a first rod 31 on one side shown in FIG. 3) and a second rod 32 disposed in parallel. The two first rods 31 have a same shape and are assembled to two sides of the base 10 respectively, and rotate with the assembly position at the base 10 as an axis C. First ends 311 of the two first rods 31 are connected to two sides of the second hot-pressing module 40. The second rod 32 is connected between the two first rods 31 and is located at the second end 312 away from the second hot-pressing module 40. The driving motor 50 is connected to the second rod 32.

In detail, the two first rods 31 are respectively slightly←-shaped rods. The first rods 31 are pivotally connected to the side plate 11 of the base 10 with a slightly turning point of the first rods as the axis C. The two first rods 31 are symmetrically disposed. Therefore, only one single side is used as an example for illustration. In addition, for example, the two first rods are disposed on an outer side of the base 10. However, in other implementations, the two first rods may further be disposed on an inner side of the base 10. In addition, at a position at which the two first rods 31 are pivotally disposed at the base 10, a connecting rod may be further disposed to be connected between the two first rods 31, to strengthen binding with the side plate 11 of the base 10 and increase support strength.

The driving motor 50 may push the second rod 32 to reciprocate through the actuating rod as described above. It can be seen from FIG. 4 to FIG. 6 that, at the standby position, the second rod 32 is at the position shown in FIG. 4. When the to-be-heated food is about to be heated, the control module 60 activates the driving motor 50 after receiving an activation instruction. At this time, the driving motor 50 pushes the second rod 32 to move obliquely behind the base 10. At this time, the second rod 32 drives the two first rods 31 to cause the two first rods 31 to pivot with the axis C as a rotation axis. When the driving motor 50 pushes the second rod 32 to the heating position, the second hot-pressing module 40 located at a first end 311 of the first rod 31 covers the first hot-pressing module 20 to heat the to-be-heated food.

In some implementations, an opening may be disposed on the side plate 11 of the base 10, so that the second rod 32 passes through the opening and is connected to the two first rods 31 disposed at an outside, and the driving motor 50 can only drive the second rod 32 to reciprocate within a fixed range. In this embodiment, as shown in FIG. 3 to FIG. 6, a limiting groove 13 is disposed on a single side plate 11 or two side plates 11 of the base 10. The second rod 32 passes through the limiting groove 13 and is moved between the standby position (as shown in FIG. 4) and the heating position (as shown in FIG. 6) under the limit of the limiting groove 13.

Further, in order to double-check and add a foolproof mechanism, the sandwich maker 100 in this embodiment further includes a first sensor 91 and a second sensor 92. The first sensor 91 and the second sensor 92 are assembled to the base 10 and electrically connected to the control module 60. When the connecting rod set 30 is moved to the standby position, the connecting rod set 30 activates the first sensor 91. When the connecting rod set 30 is moved to the heating position, the connecting rod set 30 activates the second sensor 92. The first sensor 91 and the second sensor 92 may be implemented by, for example, a micro switch. When a second end 312 of the first rod 31 of the connecting rod set 30 touches the first sensor 91 or the second sensor 92, it means that the connecting rod set 30 has been moved to the standby position (as shown in FIG. 4) or the heating position (as shown in FIG. 6).

In order to allow a space to be used effectively and avoid a sensing error due to inaccurate touch, the first sensor 91 and the second sensor 92 may be disposed on an outer surface of the side plate 11 on one side of the base 10. A third rod 33 is disposed to extend from the first rod 31 close to the second end 312. When the connecting rod set 30 is at the standby position as shown in FIG. 4, the third rod 33 touches the first sensor 91, so that the first sensor 91 sends a signal to the control module 60. At this time, the control module 60 detects that the connecting rod set 30 is currently at the standby position. When the connecting rod set 30 is rotated and moved to the heating position as shown in FIG. 6 under actuation of the driving motor 50, the third rod 33 touches the second sensor 92, so that the second sensor 92 sends a signal to the control module 60. At this time, the control module 60 detects that the connecting rod set 30 is currently at the heating position.

The control module 60 may stop the actuation of the driving motor 50 after receiving the signals from the first sensor 91 and the second sensor 92. For example, when the control module 60 controls the driving motor 50 to continuously actuate toward the heating position, after the control module receives the signal from the second sensor 92, it means that the connecting rod set 30 has pivoted to the heating position. At this time, the control module 60 may control the driving motor 50 to stop actuation, and actuates the first hot-pressing module 20 and the second hot-pressing module 40 to perform heating. After the heating is completed, the control module 60 then controls the driving motor 50 to continuously actuate toward the standby position. After the control module receives the signal from the first sensor 91, it means that the connecting rod set 30 has pivoted to the standby position. At this time, the control module 60 may control the driving motor 50 to stop actuation.

In addition, in order to strengthen support for the second hot-pressing module 40 and to enable the second hot-pressing module 40 to move stably driven by the connecting rod set 30, the sandwich maker 100 may further include a support rod set 34. One end of the support rod set 34 is pivotally connected to the base 10, and the other end thereof is pivotally connected to the second hot-pressing module 40. As shown in FIG. 3, the support rod set 34 may be a single rod or two rods disposed in parallel. In addition, one end of the support rod set 34 may be pivotally disposed on a support column 12 to pivot relative to the base 10. The other end of the support rod set 34 is pivotally connected to the second hot-pressing module 40, so that the second hot-pressing module 40 can be moved more stably with more support force when the second hot-pressing module falls driven by the connecting rod set 30.

In addition, in this embodiment, as shown in FIG. 3 and FIG. 4, the sandwich maker 100 further includes an ejector rod 35 and an ejector mold 36. A first end 351 of the ejector rod 35 is pivotally connected to the connecting rod set 30 and is moved to the standby position and the heating position driven by the connecting rod set 30. A second end 352 of the ejector rod 35 extends above the first hot-pressing module 20. The ejector mold 36 is disposed at the second end 352. It can be known from FIG. 3 and FIG. 4 that the ejector rod 35 and the connecting rod set 30 are pivotally connected at a same position. When the connecting rod set 30 pivots, the ejector rod 35 is also driven to pivot. As shown in FIG. 4, when the ejector rod 35 is at the standby position, a second end 352 of the ejector rod extends above the first hot-pressing module 20 and slightly higher than the first hot-pressing module 20. In this way, when the user is to place to-be-heated food, the to-be-heated food may be placed on the ejector mold 36 assembled to the second end 352 of the ejector rod 35. When the ejector rod 35 pivots to the heating position driven by the connecting rod set 30, as shown in FIG. 6, the ejector mold 36 abuts against the first hot-pressing module 20. At this time, the to-be-heated food is received in the first pressing mold 22 of the first hot-pressing module 20.

After the heating is completed, the ejector rod 35 is further pivoted from the heating position to the standby position driven by the connecting rod set 30. At this time, the to-be-heated food placed at the ejector mold 36 is also away from the first pressing mold 22 of the first hot-pressing module 20 driven by the ejector mold 36. In this way, continuous heating of the heated food may be stopped, and the user can pick up the heated food more easily by using a tool such as a clamp.

It can be seen from FIG. 2 that the ejector mold 36 is a detachable assembly. The ejector mold 36 may be replaced appropriately according to a size of the heated food. The ejector mold 36 includes a hollow portion 361, a plurality of lugs 362, and an opening 363. The hollow portion 361 is located in the middle of the ejector mold 36. A shape of the hollow portion may be changed according to the shape of the to-be-heated food. The plurality of lugs 362 are disposed to extend from a side edge to the hollow portion 361 to lift the to-be-heated food disposed at the hollow portion 361. In addition, the opening 363 may be disposed on a side edge of the ejector mold 36, such as a front side shown in FIG. 3, to help the user pick up the heated food more easily by using the clamp.

In addition, it can be seen from FIG. 2 that in this embodiment, two sets of assemblies as shown in FIG. 3 are disposed in an outer housing 70 to form the sandwich maker 100 that can heat two pieces of to-be-heated food simultaneously. The two sets of assemblies may be controlled by a set of control modules 60, so that the two sets of assemblies are actuated simultaneously, respectively, or singly. A control panel of the control module 60 may be disposed in front of the outer housing 70 to provide control signals or display current control statuses respectively, such as a heating mode, heating time, etc.

As shown in FIG. 7, a schematic diagram of an appearance is shown according to another embodiment of the present invention. A difference between this embodiment and from the previous embodiment is only that the used first pressing mold 22 and second pressing mold 42 are different. It can be seen from FIG. 7 that different first pressing molds 22a and second pressing molds (not shown) may be used for two sets of assemblies to hot press a desired shape.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:
1. A sandwich maker, comprising:
a base;
a first hot-pressing module assembled to the base;
a connecting rod set pivotally disposed on the base and pivoting between a standby position and a heating position;
a second hot-pressing module assembled to the connecting rod set and moved between the standby position and the heating position driven by the connecting rod set, wherein at the standby position, the second hot-pressing module is away from the first hot-pressing module; and at the heating position, the second hot-pressing module correspondingly covers the first hot-pressing module;
a driving motor connected to and driving the connecting rod set;
a control module electrically connected to and controlling the first hot-pressing module, the second hot-pressing module, and the driving motor;
an ejector rod, wherein a first end of the ejector rod is pivotally connected to the connecting rod set and is moved to the standby position and the heating position driven by the connecting rod set, a second end of the ejector rod extends above the first hot-pressing module; and
an ejector mold disposed at the second end.

2. The sandwich maker according to claim 1, wherein the connecting rod set comprises two first rods and a second rod, wherein the two first rods are respectively assembled to two sides of the base and rotate with an assembling position on the base as an axis, ends of the two first rods are connected to two sides of the second hot-pressing module, the second rod is connected between the two first rods and located at an end away from the second hot-pressing module, and the driving motor is connected to the second rod.

3. The sandwich maker according to claim 2, wherein the base comprises a limiting groove, and the second rod penetrates through the limiting groove and is moved between the standby position and the heating position under the limit of the limiting groove.

4. The sandwich maker according to claim 1, further comprising a first sensor and a second sensor, wherein the first sensor and the second sensor are assembled to the base and electrically connected to the control module, wherein when the connecting rod set is moved to the standby position, the connecting rod set activates the first sensor; and when the connecting rod set is moved to the heating position, the connecting rod set activates the second sensor.

5. The sandwich maker according to claim 1, further comprising a support rod set, wherein one end of the support rod set is pivotally connected to the base, and the other end thereof is pivotally connected to the second hot-pressing module.

6. The sandwich maker according to claim 1, wherein the ejector mold comprises a hollow portion and a plurality of lugs, and the lugs are disposed to extend from a side edge to the hollow portion.

7. The sandwich maker according to claim 6, wherein the ejector mold further comprises an opening on one side.

8. The sandwich maker according to claim 1, wherein the first hot-pressing module comprises a first heating device and a first pressing mold, and the second hot-pressing module comprises a second heating device and a second pressing mold, wherein the first pressing mold is detachably assembled to the first heating device, and the second pressing mold is detachably assembled to the second heating device.

9. The sandwich maker according to claim 1, further comprising an outer housing and an opening-closing cover, wherein the outer housing covers the base, the first hot-pressing module, the connecting rod set, the second hot-pressing module, and the driving motor, wherein the control module is assembled to the outer housing, and the opening-closing cover is assembled to the outer housing to place to-be-heated food or take out heated food through the opening-closing cover.

* * * * *